US010364925B2

(12) United States Patent
Roberts et al.

(10) Patent No.: US 10,364,925 B2
(45) Date of Patent: Jul. 30, 2019

(54) SEAL RING ELEMENT

(71) Applicant: GE Oil & Gas UK Limited, Bristol (GB)

(72) Inventors: Andrew Peter Roberts, Bristol (GB); Zhimin Tan, Bristol (GB)

(73) Assignee: GE OIL & GAS UK LIMITED, Bristol (GB)

( * ) Notice: Subject to any disclaimer, the term of this patent is extended or adjusted under 35 U.S.C. 154(b) by 0 days.

(21) Appl. No.: 14/784,894

(22) PCT Filed: Mar. 28, 2014

(86) PCT No.: PCT/GB2014/050994
§ 371 (c)(1),
(2) Date: Oct. 15, 2015

(87) PCT Pub. No.: WO2014/174244
PCT Pub. Date: Oct. 30, 2014

(65) Prior Publication Data
US 2016/0053928 A1  Feb. 25, 2016

(30) Foreign Application Priority Data

Apr. 24, 2013 (GB) .................................. 1307389.5

(51) Int. Cl.
*F16J 15/02* (2006.01)
*F16L 33/18* (2006.01)
(Continued)

(52) U.S. Cl.
CPC ............... *F16L 33/18* (2013.01); *F16J 15/02* (2013.01); *F16L 17/08* (2013.01); *F16L 33/01* (2013.01)

(58) Field of Classification Search
CPC ....... F16J 15/0887; F16J 15/104; F16L 21/02; F16L 21/03; F16L 21/035; F16L 21/04;
(Continued)

(56) References Cited

U.S. PATENT DOCUMENTS 4,178,020 A * 12/1979 Dopyera ............... F16L 37/002
277/607
4,787,642 A * 11/1988 Etheridge ............... E21B 33/04
277/550

(Continued)

FOREIGN PATENT DOCUMENTS

CN  201066003  5/2008
CN  101625026  1/2010
(Continued)

OTHER PUBLICATIONS

GB Search Report for App No. GB 1307389.5 dated Oct. 9, 2013.
(Continued)

*Primary Examiner* — Gilbert Y Lee
(74) *Attorney, Agent, or Firm* — Knobbe Martens Olson and Bear, LLP

(57) ABSTRACT

A seal ring, a method of providing a fluid seal and end fitting are disclosed. The seal ring which provides a fluid seal between a polymer layer and an end fitting of a flexible pipe comprises an annular body that has a cross section comprising a first arm portion (500) and further arm portion (510) extending in a spaced apart relationship away from a body end portion (530).

18 Claims, 10 Drawing Sheets

Figure 1:
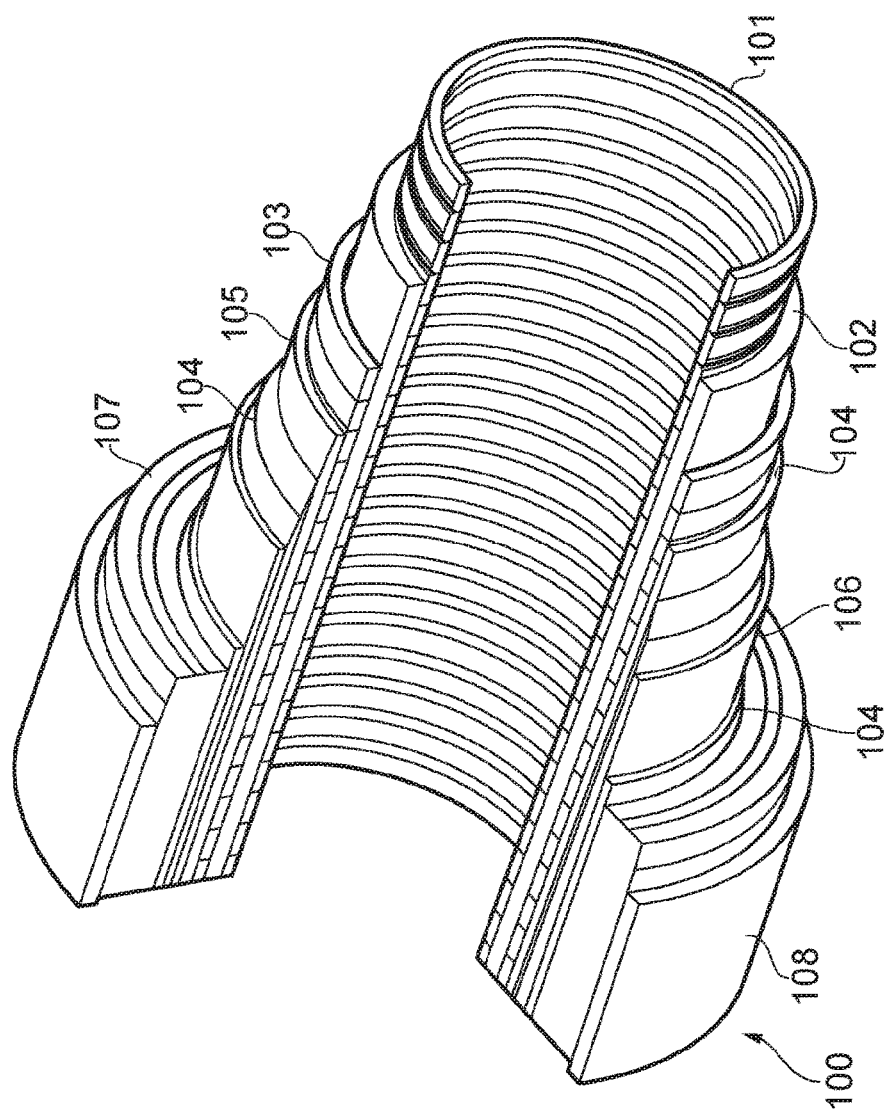

(51) Int. Cl.
*F16L 17/08* (2006.01)
*F16L 33/01* (2006.01)

(58) Field of Classification Search
CPC ......... F16L 21/05; F16L 21/06; F16L 21/065; F16L 21/08
See application file for complete search history.

(56) References Cited

U.S. PATENT DOCUMENTS

| | | | |
|---|---|---|---|
| 5,129,660 A * | 7/1992 | Taylor | E21B 33/03 166/196 |
| 5,354,072 A | 10/1994 | Nicholson | |
| 6,367,558 B1 | 4/2002 | Borak, Jr. | |
| 8,205,890 B2 * | 6/2012 | Sundararajan | E21B 33/04 277/339 |
| 8,376,057 B2 * | 2/2013 | Dyson | E21B 33/043 166/208 |
| 8,851,194 B2 * | 10/2014 | Ford | E21B 33/0422 166/387 |
| 2003/0155717 A1 | 8/2003 | Zheng | |
| 2004/0036280 A1 | 2/2004 | Belcher | |
| 2004/0188953 A1 | 9/2004 | Fonville et al. | |
| 2011/0187059 A1 | 8/2011 | Chinchilla et al. | |

FOREIGN PATENT DOCUMENTS

| | | |
|---|---|---|
| CN | 202349207 | 7/2012 |
| CN | 102865048 | 1/2013 |
| GB | 2273537 | 6/1994 |
| GB | 2355479 | 4/2001 |
| GB | 2492654 | 1/2013 |
| JP | 07012233 | 1/1995 |
| WO | WO 2003/071169 | 8/2003 |
| WO | WO 2004/001269 | 12/2003 |
| WO | WO 2004/076907 | 9/2004 |
| WO | WO 2007/144553 | 12/2007 |
| WO | WO 2012/146905 | 11/2012 |
| WO | WO 2014/174244 | 3/2014 |

OTHER PUBLICATIONS

International Search Report for App No. PCT/GB2014/050994 dated Oct. 30, 2014, 5 pages.
International Preliminary Report on Patentability for international app No. PCT/GB2014/050994 dated Oct. 27, 2015.

* cited by examiner

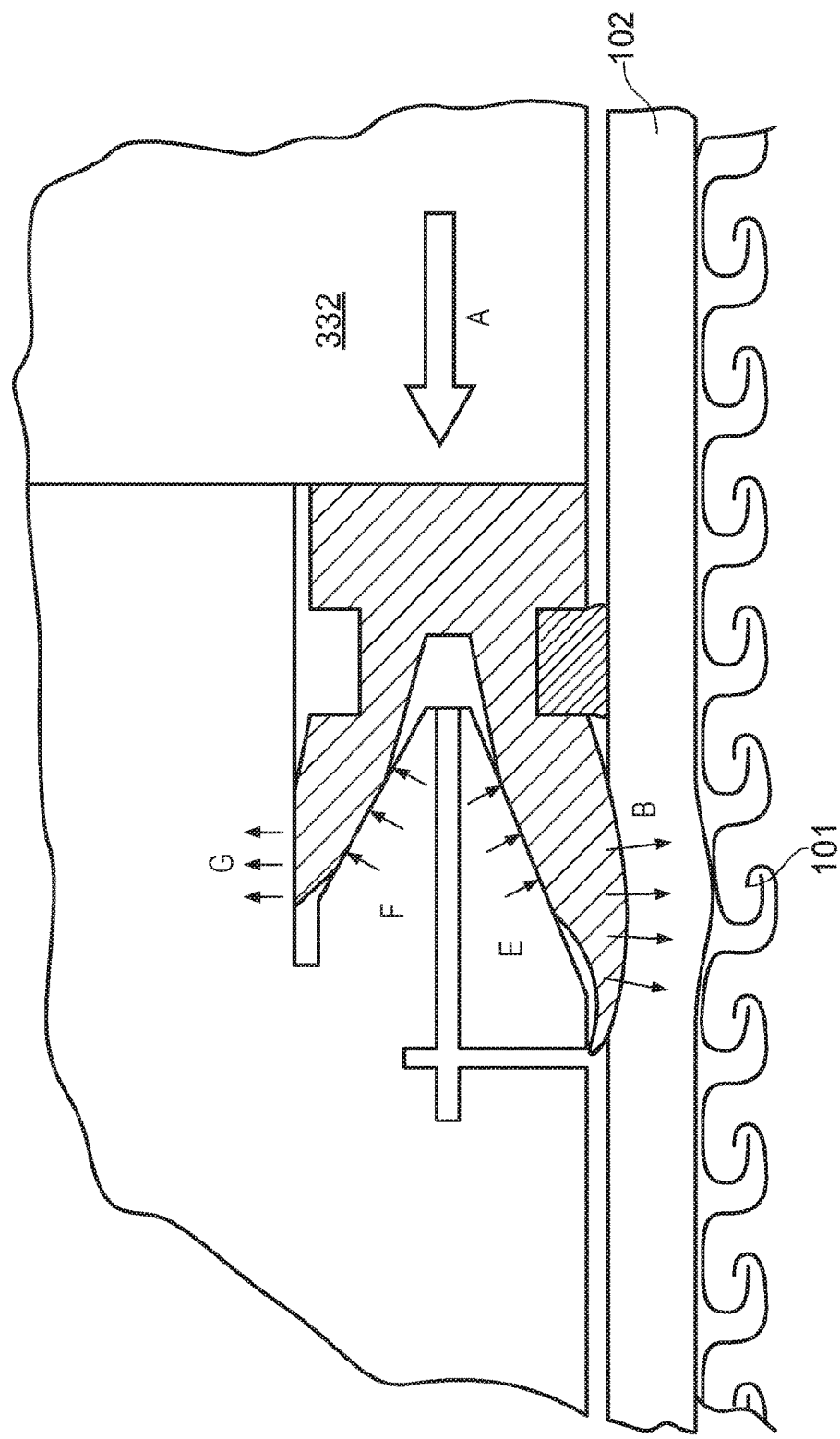

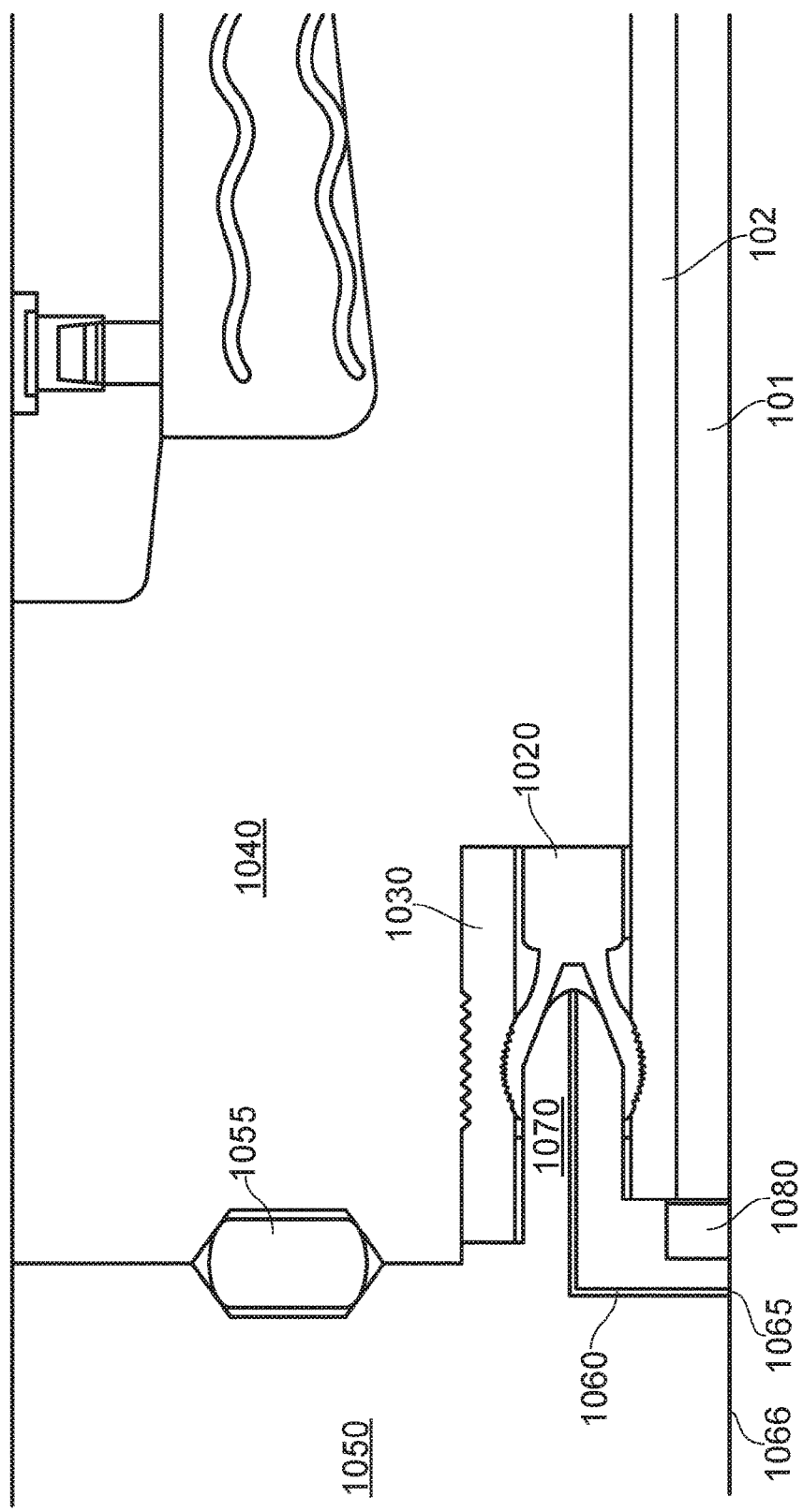

SEAL RING ELEMENT

The present invention relates to a method and apparatus for securing flexible pipe body in an end fitting. In particular, but not exclusively, the present invention relates to the use of a seal ring to provide a fluid seal between a polymer layer of the flexible pipe body and the end fitting.

Traditionally, flexible pipe is utilised to transport production fluids, such as oil and/or gas and/or water, from one location to another. Flexible pipe is particular useful in connecting a sub-sea location to a sea level location. Flexible pipe is generally formed as an assembly of a segment of flexible pipe body and one or more end fittings. The pipe body is typically formed as a composite of layered materials that form a pressure-containing conduit. The pipe structure allows large deflections without causing bending stresses that impair the pipe's functionality over its lifetime. The pipe body is generally built up as a composite multi-layer structure including metallic and polymer layers.

The end fittings of a flexible pipe may be used for connecting segments of flexible pipe together or for connecting them to terminal equipment such as rigid sub-sea structures or floating facilities. As such, amongst other varied uses, flexible pipe can be used to provide a riser assembly for transporting fluids from a sub-sea flow line to a floating structure. In such a riser assembly a first segment of flexible pipe may be connected to one or more further segments of flexible pipe in an in-line configuration. Each segment of flexible pipe includes at least one end fitting.

It is well known that there are many varied problems associated with the provision of end fittings for ends of flexible pipe body and for the way ends of the flexible pipe body can be terminated in such end fittings. The end fittings must ensure both good fastening and good sealing. Particular problems occur when the various specific layers of the multi-layer flexible pipe body are terminated. The flexible pipe body may include layers having very different material characteristics such as single polymer layers and/or interlocked metallic layers. The termination of each of these layers in an end fitting brings with it characteristic problems. For example, flexible pipe body typically includes a barrier layer or liner formed as a polymer sheath. Such a layer operates as a primary liquid retaining layer. To prevent collapse of this layer or to prevent rupture of such a layer under high pressure caused by the pressure of the transported fluid, an interlocked wire layer is often located inside and outside the fluid retaining layer. Further armour layers formed by layers of wire may also be provided to help sustain tensile loads and internal pressure. All of these layers must be adequately terminated in an end fitting of some kind at the two ends of any segment of pipe body.

It is vitally important to provide a fluid seal where any fluid containing layer is terminated in an end fitting. A continuous fluid impermeable dam must effectively be provided that blocks flow of fluid out of a central bore region of a flexible pipe. Current sealing technology utilises a pre-loaded seal. In such circumstances, it is known that internal pressure from an internal bore region of a flexible pipe can in fact act to reduce a contact force on a metal-to-metal face of a seal. This can lead to rotation at a seal interface and ultimately joint separation. This can cause flexible pipe failure.

It is an aim of the present invention to at least partly mitigate the above-mentioned problems.

It is an aim of certain embodiments of the present invention to provide an improved seal ring and end fitting configuration, suitable for very high pressure applications, to provide a high degree of seal integrity over a long period of time.

It is an aim of certain embodiments of the present invention to provide a seal ring which has a body with parts that can simultaneously be urged radially inwardly and radially outwardly to maximise a sealing effect against underlying and overlying parts.

It is an aim of certain embodiments of the present invention to utilise an available internal positive pressure to enhance rather than reduce a contact pressure at a metal-to-metal and/or metal-to-polymer surface where a seal ring is utilised. This helps make seal integrity less susceptible to joint separation.

It is an aim of certain embodiments of the present invention to provide a method of providing a fluid seal between a polymer layer and an end fitting of a flexible pipe.

It is an aim of certain embodiments of the present invention to provide an end fitting which itself provides a fluid communication passageway to communicate positive pressure from a bore region of flexible pipe to one or more locations where such positive pressure can be used to help energise a seal element and/or assist with a sealing process.

It is an aim of certain embodiments of the present invention to provide a method of terminating flexible pipe body in an end fitting.

According to a first aspect of the present invention there is provided a seal ring element for providing a fluid seal between a polymer layer and an end fitting of a flexible pipe, comprising of an annular body that has a cross section comprising a first arm portion and further arm portion extending in a spaced apart relationship away from a body end portion.

Aptly the first arm portion comprises the first abutment surface that faces a corresponding further abutment surface of the further arm portion, said first and further abutment surfaces being progressively spaced apart in a direction away from the end portion.

Aptly the first and further arm portion are spaced apart to provide a flat bottomed V-shaped groove in the annular body facing away from the end portion.

Aptly the first arm portion is substantially wedge shaped and tapers to a narrow first arm end region distal to the end portion.

Aptly an outer pipe body facing surface of the first arm portion is substantially flat.

Aptly the outer pipe body facing surface of the first arm portion comprises at least one serration.

Aptly the outer pipe body facing surface of the first arm portion extends into a pipe body facing surface of the end portion.

Aptly the outer pipe body facing surface of the first arm extends into the pipe body facing surface of the end portion via a cut out region.

Aptly the cut out region is full of gap filler material.

Aptly the outer pipe body facing surface of the first arm portion and the pipe body facing surface region of the end portion together comprise a radially innermost surface of the annular body.

Aptly the further arm portion is substantially wedged shaped and tapers to a narrow further arm end region distal to the end portion.

Aptly an outer polymer sleeve facing surface of the further arm portion is substantially flat.

Aptly the outer polymer sleeve facing surface of the further arm portion comprises at least one serration.

Aptly the outer polymer sleeve facing surface of the further arm portion extends into a polymer sleeve facing surface of the end portion.

Aptly the outer polymer sleeve facing surface of the further arm portion extends into the polymer sleeve facing surface of the end portion via a cut out region.

Aptly the cut out region is full of gap filler material.

Aptly the further arm portion comprises an outer end fitting facing surface comprising a first flat region extending from a point at an end of a tip of the further arm portion, via a bend, to a further flat region extending towards the end portion.

Aptly the outer end fitting body facing surface of the further arm portion extends into an end fitting facing surface of the end portion.

Aptly the outer end fitting facing surface of the further arm portion extends into the end fitting facing surface of the abutment end portion via a cut out region.

Aptly the cut out region is full of gap filler material.

Aptly the outer end fitting facing surface of the further arm portion and the end fitting facing surface of the end portion together comprise a radially outermost surface of the annular body.

Aptly the end portion comprises an abutment surface extending between a radially innermost and outermost surface of the annular body.

Aptly the abutment surface comprises a cut out region full of gap filler material or providing a seat for an 'O' ring.

Aptly the annular body is integrally formed from a metallic material.

Aptly the seal ring element provides at least two metal-to-metal sealing surfaces.

Aptly the seal ring element has a substantially C-shaped or V-shaped or K-shaped cross section.

According to a second aspect of the present invention there is provided a method of providing a fluid seal between a polymer layer and an end fitting of a flexible pipe, comprising the steps of an inner end fitting member is secured to an end fitting body of an end fitting, simultaneously urging a first arm portion of an annular body of a seal ring element, located in a recessed region between the inner end fitting member and the end fitting body, radially inwardly and a further arm portion of the annular body radially outwardly.

Aptly the method further comprises urging an outer pipe body facing surface of the first arm potion into a polymer layer of flexible pipe body terminated in the end fitting when the first arm is urged radially inwardly.

Aptly the method further comprises urging an outer polymer sleeve facing surface of the further arm portion into a polymer sleeve, located in an annular space, in the recessed region, between the annular body and the inner end fitting member or the end fitting body when the further arm is urged radially outwardly.

Aptly the method further comprises urging an outer end fitting facing surface of the further arm portion into a radially inwards facing surface of the inner end fitting member or the end fitting body when the further arm is urged radially outwardly.

Aptly the method further comprises providing a positive pressure at an interface region between at least one of the first and further arms and the end fitting body.

Aptly the method further comprises providing the positive pressure via at least one fluid communication passageway that extends from a respective inlet at an inlet region of the end fitting body, in fluid communication with an inner bore region of flexible pipe body being terminated in the end fitting, to a respective outlet in an annular nose-shaped region protruding from an abutment surface of the end fitting body.

Aptly the method further comprises providing the positive pressure at a location where the nose-shaped region opposes a groove provided between the first and further arm portions.

Aptly the method further comprises, as the inner end fitting member is secured, driving the inner end fitting member against an abutment surface of a body end portion of the annular body thereby driving the annular body against the nose-shaped region of the end fitting body.

Aptly the method further comprises providing the fluid seal between a polymer layer comprising an internal pressure sheath of a flexible pipe and an end fitting of the flexible pipe.

According to a third aspect of the present invention there is provided an end fitting for a flexible pipe, comprising an end fitting body and an inner end fitting member wherein the end fitting body comprises an annular nose-shaped region extending in an inner end fitting member facing direction away from a flange fitting end of the end fitting body.

Aptly the end fitting further comprises a seal ring element comprising an annular body that has a cross section comprising a first arm portion and a further arm portion extending in a spaced apart relationship away from a body end portion.

Aptly the inner end fitting member comprises an inner collar member that comprises a main collar body portion and a neck portion extending away from the main collar body portion.

Aptly the end fitting further comprises a sealing seat and associated seal ring element on an abutment surface of the main collar body portion.

Aptly the end fitting further comprising a polymer sleeve comprising an annular body integrally formed from a polymer material locatable in an annular recess between the inner end fitting member, or the end fitting body, and the seal ring element.

Aptly the end fitting further comprising at least one fluid communication passageway extending from an inlet at an inlet region of the end fitting body to a respective outlet on the nose-shaped region.

Aptly the outlet is located at an apex region of the nose-shaped region.

According to a fourth aspect of the present invention there is provided an end fitting for a flexible pipe, comprising an end fitting body and an inner end fitting member; wherein at least one fluid communication passageway extends from an inlet at an inlet region of the end fitting body to an outlet located proximate to an interface region between the end fitting body and a sealing ring element.

According to a fifth aspect of the present invention there is provided a method of terminating flexible pipe body in an end fitting, further comprising the steps of cutting each of one or more layers of the flexible pipe body to a respective pre-determined length; providing an inner end fitting member over an outer layer of flexible pipe body; providing a seal ring element over the layer of the flexible pipe body; providing an end fitting body at a cut end of the flexible pipe body; and securing the inner end fitting member to the end fitting body whilst simultaneously energising a seal ring element having a cross section that includes two arms, against a polymer layer of the flexible pipe body and a radially outer body comprising a polymer sleeve or surface of the inner end fitting member or end fitting body.

According to a sixth aspect of the present invention there is provided apparatus constructed and arranged substantially as hereinbefore described with reference to the accompanying drawings.

According to the seventh aspect of the present invention there is providing a method substantially as hereinbefore described with reference to the accompanying drawings.

Certain embodiments of the present invention provide a seal ring which has an annular body with a cross section that includes two arms extending away from a main seal ring body part. The arms and body effectively form a V-shaped seal ring so that when fluid pressure is applied to inner surfaces between arms of the seal ring, the net force tends to open up the seal deflecting each arm outwardly thus helping to increase any contact force exerted by an arm on adjacent metal or polymer parts of an end fitting and a polymer layer of the flexible pipe body.

Certain embodiments of the present invention provide a seal ring which provides two separate sealing surfaces. One makes a standard polymer-metal seal on an inner surface and the other makes a metal-to-metal seal on an outer surface. The metal-to-metal seal is in a horizontal plane and is therefore less susceptible to lose contact pressure should there be any movement in a retaining part of the end fitting.

Certain embodiments of the present invention utilise an additional polymer sleeve in a recess of a part of an end fitting. The sleeve is compressed by an outer edge of an arm of a seal ring upon assembly (termination of an end in an end fitting) to create a double metal-to-polymer seal. As a result the need for precision machining of any sealing surfaces is avoided and a more assembly tolerant sealing mechanism is provided.

Certain embodiments of the present invention help use an internal pressure, typically exerted on an inner bore region of a flexible pipe in use, to enhance a seal contact pressure.

Certain embodiments of the present invention provide a method of providing a fluid seal between a polymer layer and an end fitting of a flexible pipe. As an inner piece of an end fitting is secured to an end fitting body a first arm of an annular seal ring is urged radially inwardly whilst simultaneously a further arm of the seal ring is urged radially outwardly.

Figure 2:
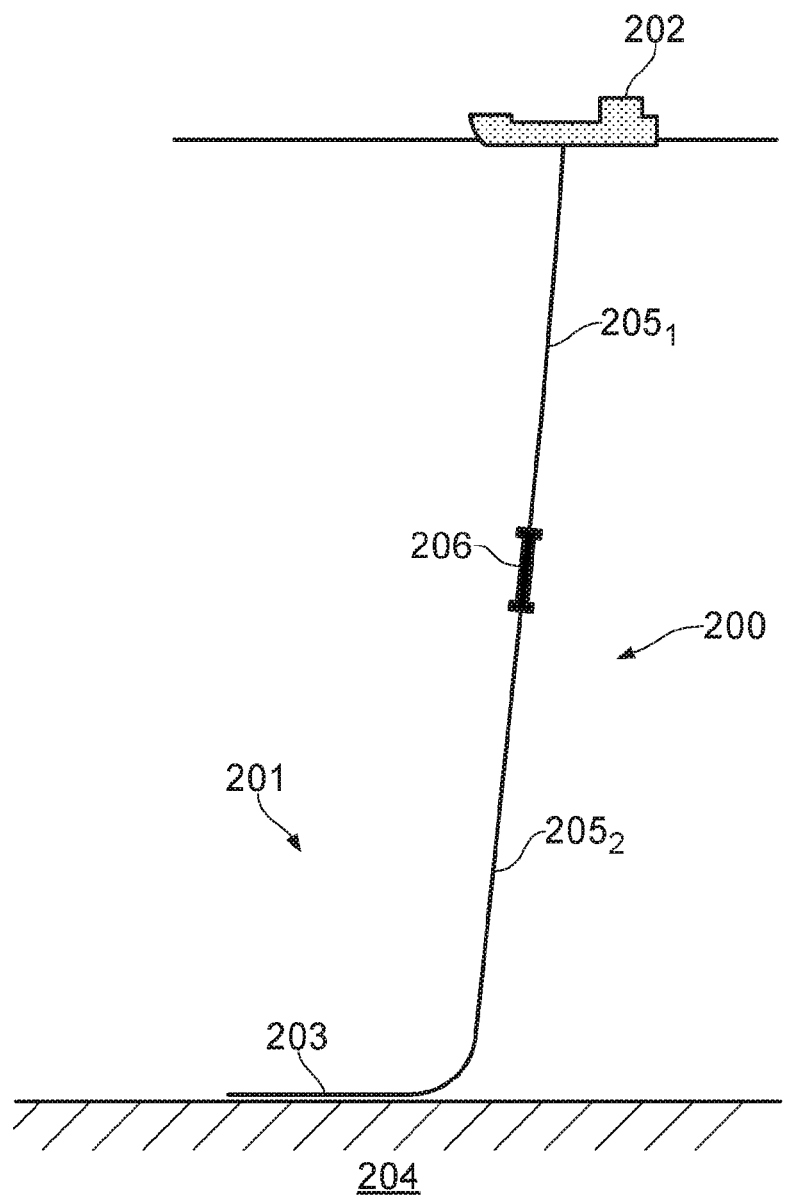
Figure 3:
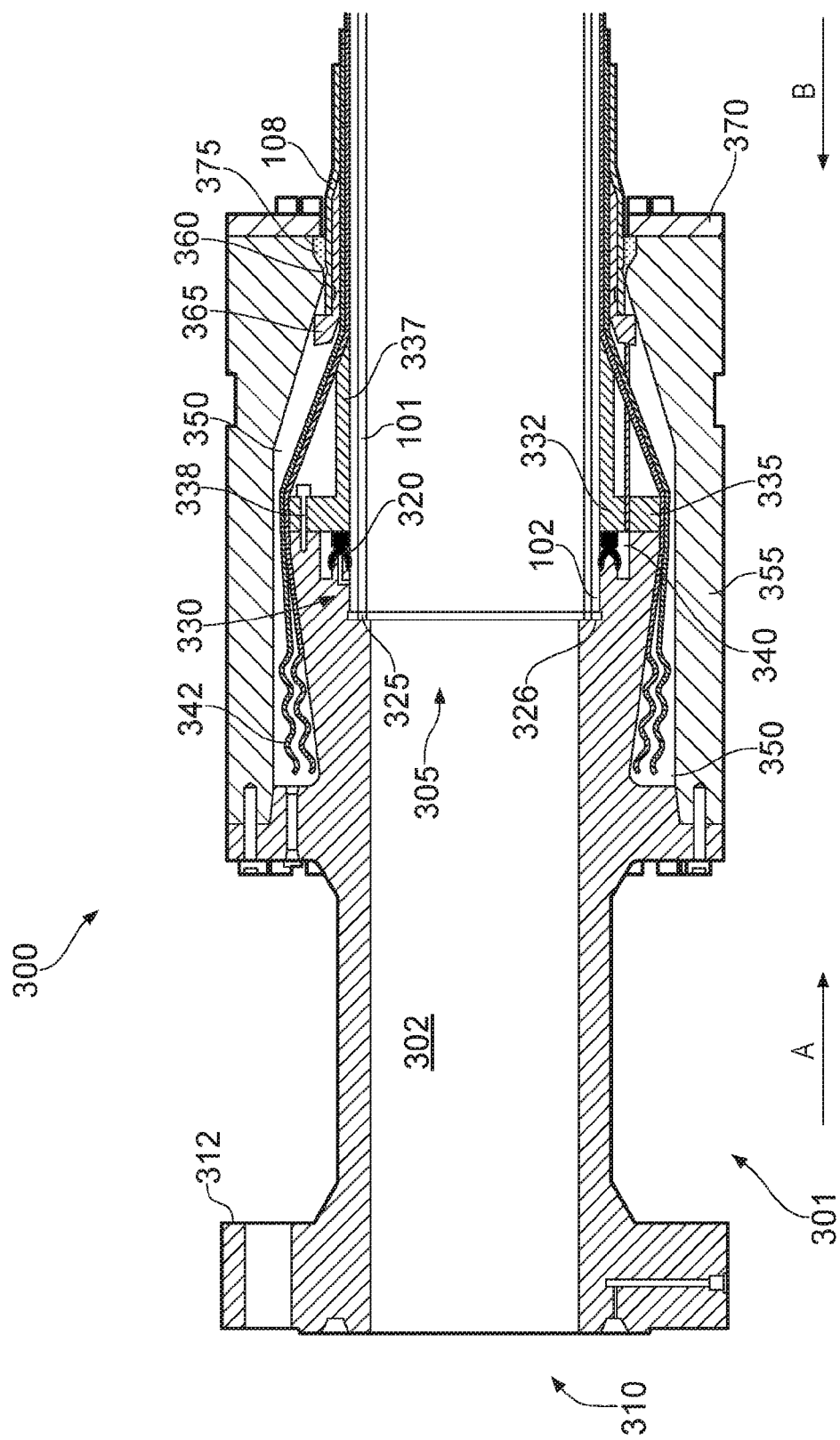
Figure 4:
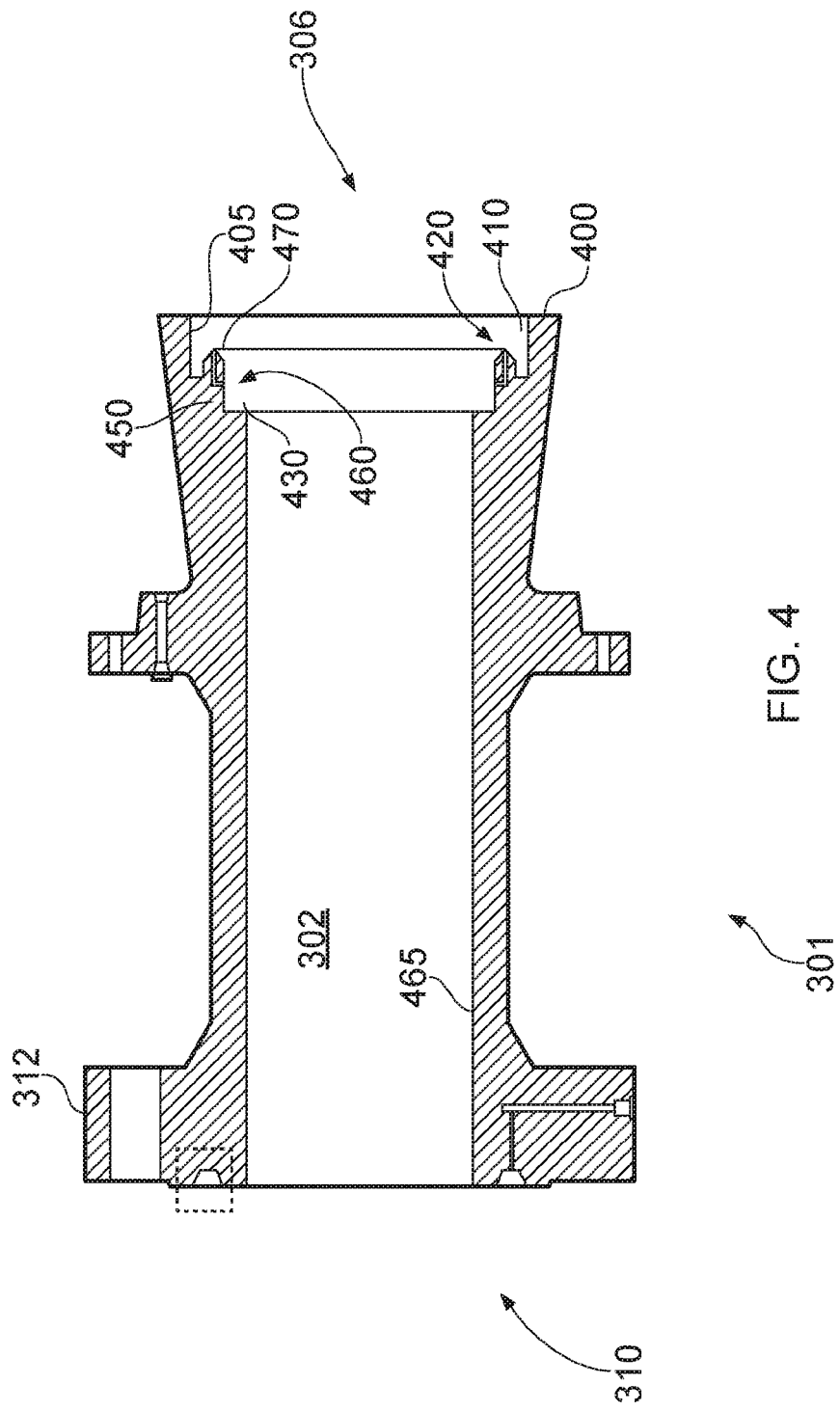
Figure 6:
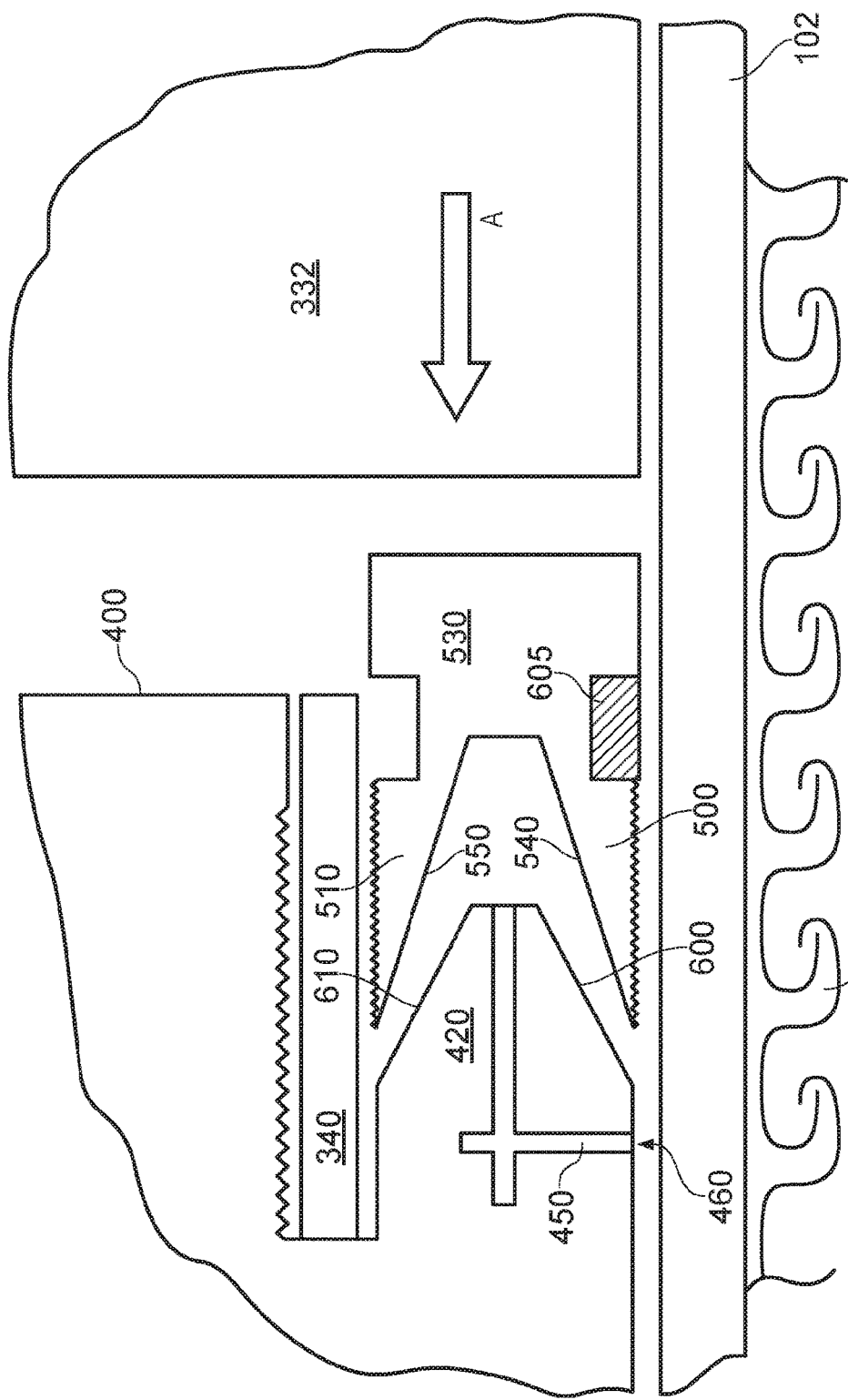
Figure 7:
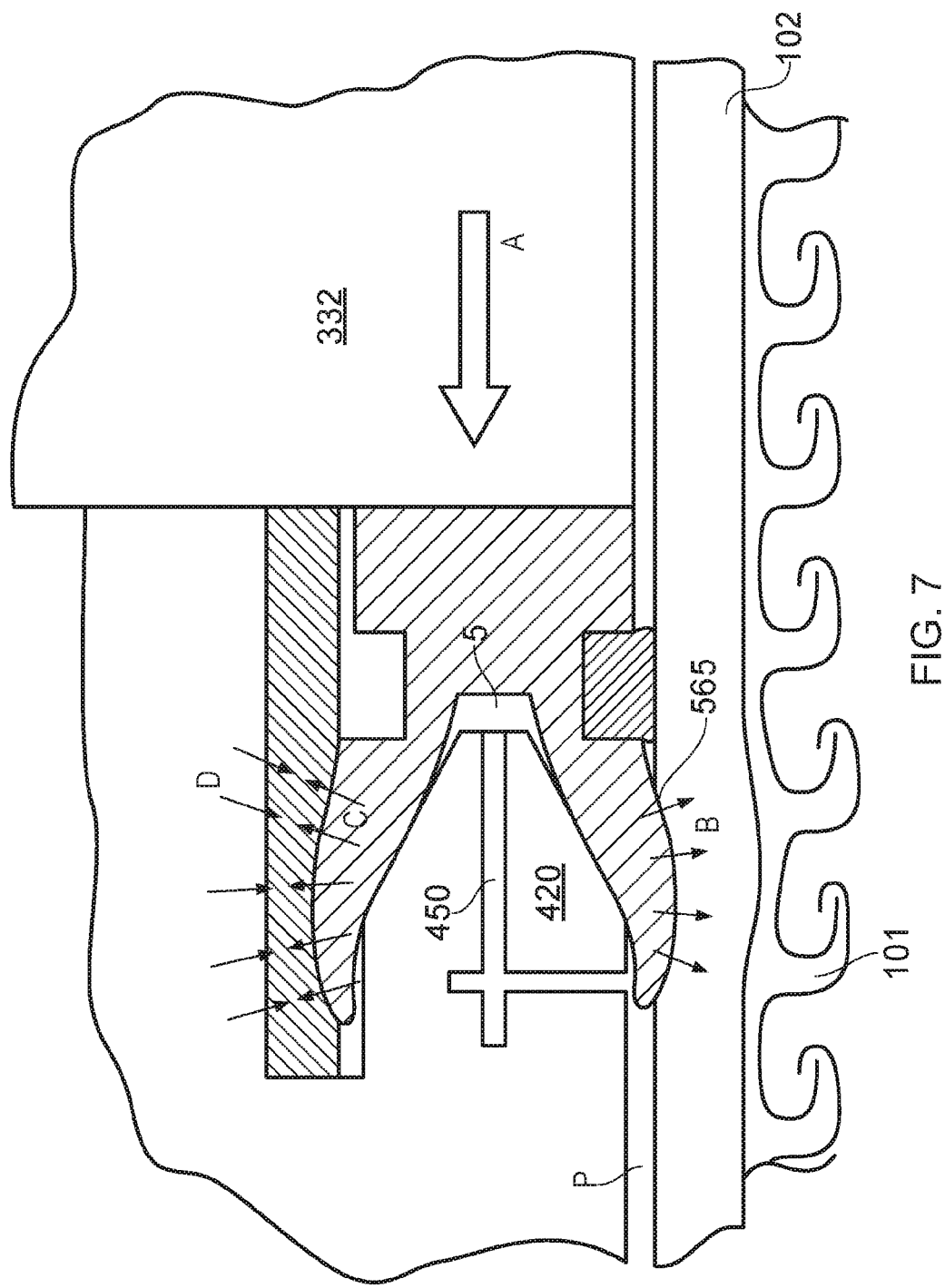
Figure 8:
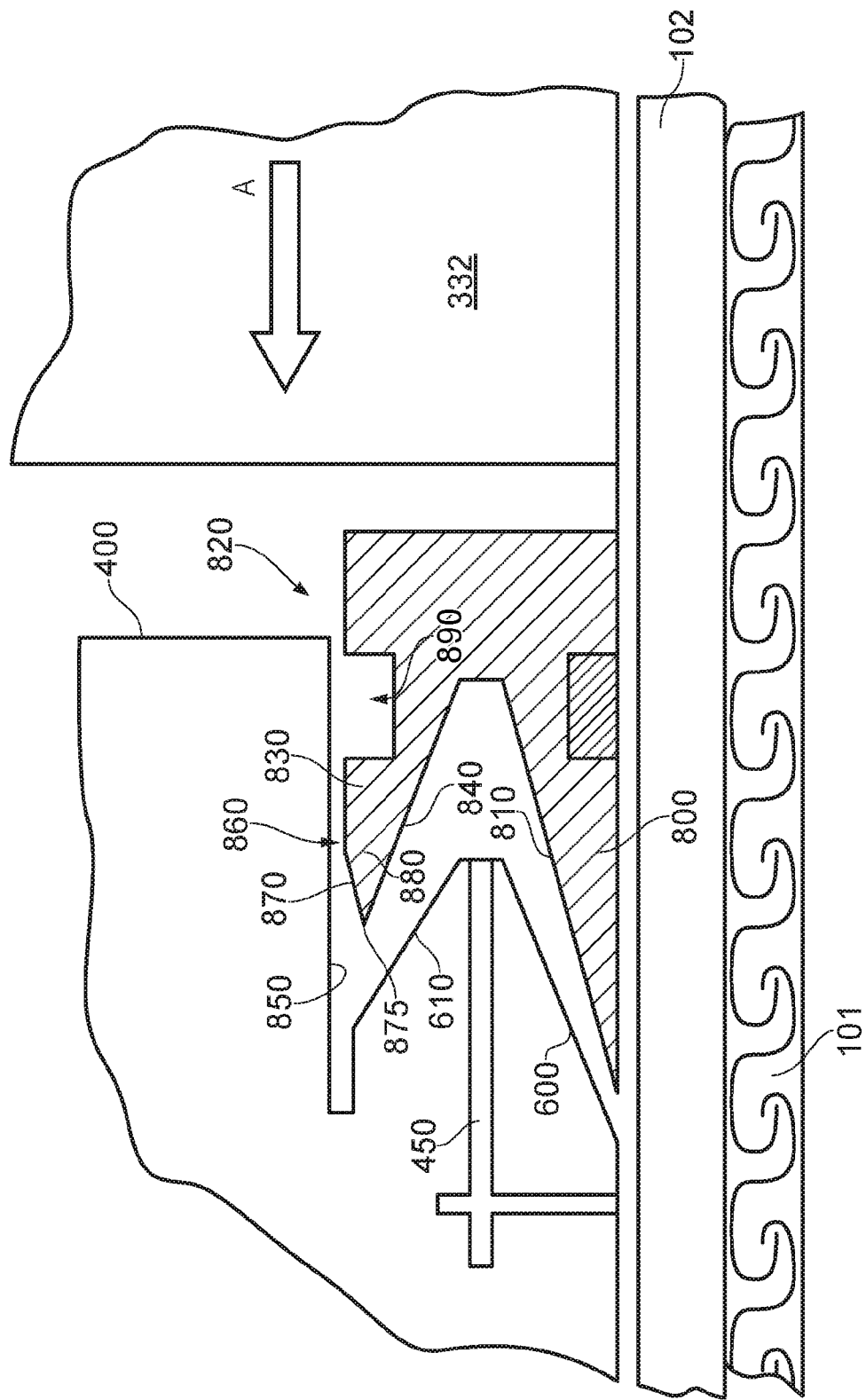

Certain embodiments of the present invention will now be described hereinafter, by way of example only, with reference to the accompanying drawings in which:

FIG. 1 illustrates flexible pipe body;
FIG. 2 illustrates use of a flexible pipe;
FIG. 3 illustrates an end of flexible pipe body terminated in an end fitting;
FIG. 4 illustrates an end fitting body;
FIG. 5 illustrates a seal ring;
FIG. 6 illustrates a seal ring pre-swaging;
FIG. 7 illustrates the seal ring shown in FIG. 6 post-swaging;
FIG. 8 illustrates an alternative seal ring pre-swaging;
FIG. 9 illustrates the seal ring as shown in FIG. 8 post-swaging; and
FIG. 10 illustrates an alternative location for a seal ring as flexible pipe body is terminated in an end fitting.

In the drawings like reference numerals refer to like parts.

Throughout this specification reference will be made to a flexible pipe. It will be understood that a flexible pipe is an assembly of pipe body and one or more end fittings in each of which a respective end of the pipe body is terminated. FIG. 1 illustrates how pipe body 100 is formed from a composite of layered materials that form a pressure-containing conduit. Although a number of particular layers are illustrated in FIG. 1, it is to be understood that the present invention is broadly applicable to composite pipe body structures including two or more layers.

As illustrated in FIG. 1, pipe body 100 typically includes an innermost carcass layer 101. The carcass provides an interlocked metallic construction that can be used as the innermost layer to prevent, totally or partially, collapse of an internal pressure sheath 102 due to pipe decompression, external pressure, tensile armour pressure and mechanical crushing loads.

The internal pressure sheath 102 typically comprises a polymer layer that ensures internal-fluid integrity. As such this layer is a fluid retaining layer. It is to be understood that this layer may itself comprise a number of sub-layers. When a carcass layer is utilised this layer is often referred to as a barrier layer. When a carcass is not used the layer is often referred to as a liner.

A pressure armour layer 103 is a structural layer with a lay angle close to 90° that increases the resistance of the flexible pipe to internal and external pressure and mechanical crushing loads. The layer also structurally supports the internal-pressure sheath and typically consists of an interlocked metallic construction.

The flexible pipe body may also include one or more layers of tape 104 and a first tensile armour layer 105 and second tensile armour layer 106. Each tensile armour layer is a structural layer with a lay angle typically between 20° and 55°. Each layer is used to sustain tensile loads and internal pressure. The tensile armour layers are typically counter-wound in pairs.

The flexible pipe body also typically includes layers of insulation 107 and an outer sheath 108 which comprises a polymer layer used to protect the pipe against penetration of seawater and other external factors resulting from the local environment. Such factors may be corrosion, abrasion and/or mechanical damage or the like.

Each flexible pipe comprises a segment of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector. Also a fluid retaining ability must be maintained.

FIG. 2 illustrates a riser assembly 200 suitable for transporting production fluid such as oil and/or gas and/or water from a sub-sea location 201 to a floating facility 202. For example, in FIG. 2, the sub-sea location 201 is a sub-sea flow line. The flexible flow line 203 comprises a flexible pipe, wholly or in part, resting on the sea floor 204 or buried below the sea floor and used in a static application. The floating facility may be provided by a platform and/or buoy or, as illustrated in FIG. 2, a ship. The riser 200 is provided as a flexible riser, that is to say a flexible pipe connecting the ship to the sea floor installation. The flexible pipe includes two segments of flexible pipe body $205_1$ to $205_2$ and one junction 206 between adjacent segments of pipe body.

It will be appreciated that there are different types of riser, as is well-known by those skilled in the art. Certain embodiments of the present invention may be used with any type of riser, such as a freely suspended riser (free, catenary riser), a riser restrained to some extent (buoys, chains), or a totally restrained riser or enclosed in a tube (I or J tubes). Also it will be appreciated that certain embodiments of the present invention can be used for single segment risers having, for example, a single long length of pipe body terminated at one or both ends with an end fitting or to multi segment risers having more than one segment.

It will also be appreciated that whilst certain embodiments of the present invention may be applied to the provision of risers, certain embodiments are generally applicable to any instance when an end fitting must be used to terminate an end of a portion of flexible pipe body.

FIG. 3 illustrates an end fitting 300 for a flexible pipe. FIG. 3 helps illustrate how an end of a segment of flexible pipe body can be terminated in an end fitting. The end fitting 300 includes an end fitting body 301 which includes an internal bore 302 running along its length. The size of the bore substantially matches a bore size of the flexible pipe body of the flexible pipe. The end fitting body is made from steel or some other rigid material. A first end 305 of the end fitting body 301 defines an open mouth region 306 (see also FIG. 4) into which an end of a segment of flexible pipe body 100 is located and then terminated. At a further end 310 of the end fitting body 301 is a connector 312. This connector is formed as a substantially flange-like flared out region of the end fitting body. The connector 312 can be connected directly to a matching connector of a further end fitting body of an adjacent segment of flexible pipe. This can be done using bolts or screws or some other such form of securing mechanism. In such a configuration the end fittings would be located in a so-called back-to-back arrangement. Alternatively the connector 312 may be connected to a floating or stationary structure such as a part of a ship, platform or other structure to which the flexible pipe is to be secured.

The inner carcass layer 101 and barrier layer 102 are terminated by being cut at a particular location to provide an end 315 to the flexible pipe body. A sealing ring 320 is located at an end of a stepped region 330 of the end fitting body so as to help seal the end 326 of the barrier layer. When the design of the flexible pipe body requires a barrier layer made up from multiple layers of polymer extrusion, or when no carcass is present in the structure (so-called smooth bore) a rigid sleeve can be inserted between some of these layers, or inside the liner respectively, to facilitate sealing, between the sealing ring and the barrier layer, by providing additional support to the polymer in the location proximate to the end 326 of the barrier layer.

An inner collar 332 is an annular element which has a collar body 335 at a first end which extends, via a neck 337, away from the connector end 310 of the end fitting. This inner collar 332 can be secured via bolts 338 or screws or the like to a face of the end fitting body. When the inner collar 332 is driven against the end fitting body the sealing ring 320 is energised and helps seal between an outer surface of the barrier layer 102 and the end fitting or, as illustrated in FIG. 3, an annular polymer sleeve 340 located in a recess in the end fitting body.

FIG. 3 helps illustrate how wires 342 of an armour layer winding may be peeled away from the flexible pipe body and terminated within a space 350 between the end fitting body and pipe and an outer jacket 355. The space may optionally be filled with epoxy. FIG. 3 also helps illustrate how a further seal, formed by a further annular sealing ring 360, can be provided by a combined action of an outer collar 365 when an end plate 370 is secured to an end of the jacket 355 engaging a body 375 of the seal ring 360. This helps provide a seal between the outer sheath 108 of the flexible pipe body and the end fitting 300. This further sealing ring 360 is illustrated as a conventional sealing ring with one arm that extends from a body part. A dual arm seal ring of the type described in more detail below could of course be used with a suitable modification being made to the body of the jacket where the seal ring fits.

FIG. 4 illustrates the end fitting body 301 shown in FIG. 3 in more detail. FIG. 4 helps illustrate the shape and configuration of the end fitting body at the open mouth end of the end fitting body. That is to say at the end of the end fitting body which receives an end of the flexible pipe body. An outermost circular end surface 400 abuts the inner collar 332 in use. The abutment surface 400 is then cut away into a substantially cylindrical space defined by a cylindrical surface 405 which forms a recess 410 which, in use, can receive a polymer sleeve 340. This recess 410 lies radially outwards of a nose-shaped region 420. The nose-shaped region 420 extends in annular fashion facing away from the connector 312. A further stepped region 430 is arranged in the end fitting body from a radially inner most part of the nose-shaped protuberance to the cylindrical surface that defines the bore of the end fitting body.

FIG. 4 also helps illustrate how a fluid communication passageway 450 extends from an opening 460 in the further stepped region 430 that communicates with the inner bore of the end fitting body and connects that opening 460 to a further opening 470 at the tip of the nose like body. The passageway 450 allows fluid pressure to be communicated from the bore region 302 to a location on the nose-shaped protuberance where a sealing ring 320 is to be energised.

Figure 5A:
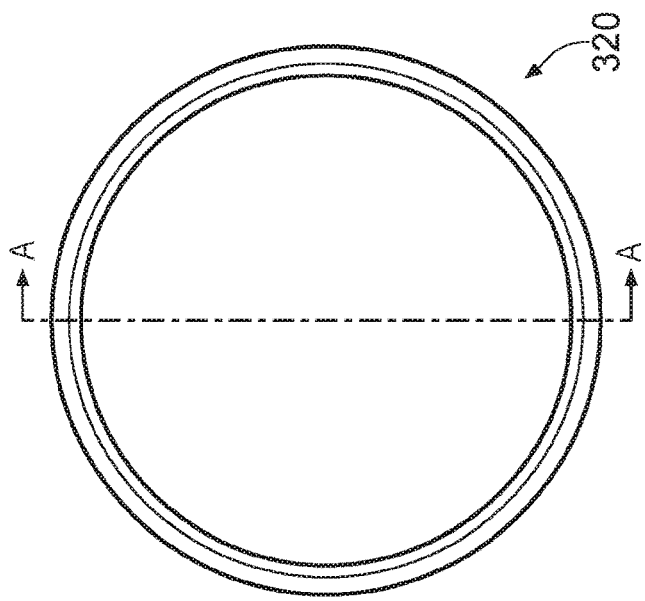

FIG. 5 illustrates a seal ring for providing a fluid seal between a polymer layer and an end fitting of a flexible pipe. As illustrated in FIG. 5A the seal ring has a common cross section and is a substantially ring-like element. The annular body of the seal ring has a cross section which includes a first arm 500 and a further arm 510. These extend in a spaced apart relationship away from an end portion 530 of the annular body. The first arm 500 includes a generally smooth inner surface 540 which is spaced apart from and faces a corresponding generally smooth inner surface 550 of the further arm 510. These surfaces form abutment surfaces which engage with the nose-shaped region of an end fitting body in use. They are progressively spaced apart away from the end portion 530 of the annular body. The abutment surfaces 540, 550 are spaced apart near the end portion 530 of the annular body to provide a flat bottomed V-shaped groove 560.

A radially innermost surface of the first arm 500 has a serrated surface 565 whilst a radially outermost surface of the further arm 510 has a serrated surface 570. The serrations, which are optional, help create a seal with an adjacent layer. Each arm of the seal ring illustrated in FIG. 5A is substantially wedged shaped and tapers to a narrow arm end away from the end portion of the annular body.

The serrated surface 565 of the first arm 500 forms a part of a pipe body facing surface of the first arm and this extends into a pipe body facing surface 575 of the end portion of the annular body via a cut out section 580. In use this cut out portion 580 can be filled with gap filler material to help improve a seal between the seal ring and an underlying layer. The further arm 510 of the seal ring illustrated in FIG. 5 presents an end fitting facing surface or polymer sleeve facing surface which includes the serrated area 570 and a corresponding outward facing surface 585 of the end portion and further cut out region 590. In use the cut out portion 590 can be filled with filler material to help create a seal against an overlying layer or body.

Figure 5B:
Figure 5C:
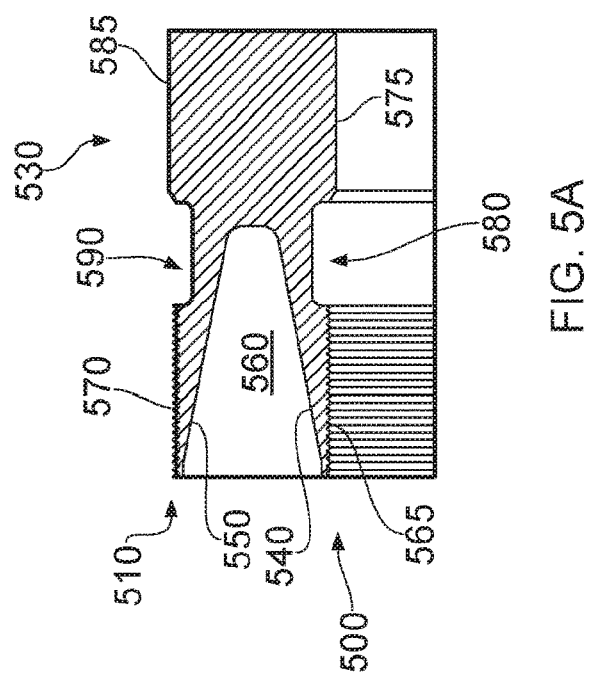

FIG. 5B helps illustrates the annular nature of the seal ring and FIG. 5C likewise helps illustrate the ring like nature of the seal ring.

FIG. 6 helps illustrate how the seal ring shown in FIG. 5 is arranged pre-swaging. That it to say before the inner collar 332 is driven against the end fitting body 301 to compress the seal ring 320 forcing the seal ring to conform to the space provided creating a permanent joint. As illustrated in FIG. 6 the seal ring 320 is located over an underlying polymer layer such as the barrier layer 102 which itself is shown formed over a carcass layer 101. FIG. 6 helps illustrate how the first arm 500 is located under a part of the nose 420 whilst the further arm 510 which is spaced apart from the first arm 500 and is radially outside the first arm is located outside the nose 420. The fluid communication pathway 450 is illustrated more clearly in FIG. 6. It will be appreciated that this can have a number of shapes such as, as illustrated in FIG. 6 being provided by two bores drilled into the material. Likewise one or more side passageways may be created as spurs off a primary bore or alternatively one or more passageways may lead to regions on the upper and lower surface of the nose rather than the tip as illustrated in FIG. 6.

Filler material 605 is illustrate in the radially innermost cut out section of the seal ring. A polymer sleeve 340 is also located in a recess radially outside the nose and the seal ring. In order to secure the inner collar 332 against the end fitting body 301 during a process of terminating a flexible pipe body the inner collar is urged in the direction illustrated by arrow A in FIG. 6. FIG. 7 helps illustrate how once the inner collar is driven against the abutment surface 400 of the end fitting, the seal ring 320 is energised. The seal ring is compressed and deforms as the inner collar is driven against the end fitting body. This deformation forces the first arm radially inwardly because the inner surface of the arm is driven against a lower surface 600 of the nose-shaped region 420. Likewise the inner surface 550 of the radially outermost arm 510 is driven against an upper surface 610 of the nose-shaped region 420. This forces the radially innermost surface 565 of the first arm of the seal ring against the underlying polymer layer in the direction shown by arrows B. This helps create a metal-polymer seal. The filler material 605 expands by virtue of the change in shape of the seal ring to additionally help fill the space and create a seal between the seal ring 320 and the polymer layer 102. The radially outermost arm 510 is likewise urged in a radial direction when the seal ring is driven in the direction shown by arrow A. However because the nose region is driven in to the V-shaped groove between the seal ring arms the radially outermost arm is driven radially outwards in the direction illustrated by arrows C. This drives the radially outermost surface of the seal ring against the polymer sleeve 340. The polymer sleeve is thus pushed against the end fitting body which creates a resistive force illustrated by arrows D. This sandwiches the polymer sleeve in the recess helping to create a good seal.

The fluid communication passageway 450 communicates positive pressure from the region P to the region S between the two arms of the sealing ring. The region P is in fluid communication with a central bore of the flexible pipe and thus in use (post fitting of the end fitting and when the flexible pipe transports high pressure production fluid) a high pressure is continually exerted at the interface region between the end fitting body and the seal. This helps constantly urge the arms of the seal ring apart against adjacent layers helping to maintain the seal and avoid failure. FIG. 7 thus illustrates the seal ring post swaging.

FIG. 8 illustrates an alternative embodiment of the present invention pre swaging. In the embodiment illustrated in FIGS. 8 and 9 the sealing ring has a first tapered arm 800 which does not include any serrations. Serrations could optionally be included. The first arm 800 has an inner abutment surface 810 which, during a swaging process, is urged against the lower surface 600 of the nose-shaped region of the end fitting body. The further arm of the seal ring 820 has a different cross sectional shape to that shown and described previously. The further arm 830 of the seal ring 820 has an inner abutment surface 840 which is driven against the upper surface 610 of the nose-shaped region. The seal ring 820 illustrated in FIG. 8 is not urged against a polymer sleeve but rather is urged against a metal surface 850 of the end fitting body. An outer end fitting facing surface 860 includes a flat section 870 extending from a pointed tip 875 via a bend 880 to a further flat region which then extends towards the end portion via a cut out section 890.

FIG. 9 illustrates the seal ring 820 illustrated in FIG. 8 in more detail post-swaging. As illustrated in FIG. 9 the first arm 800 of the seal ring 820 is urged radially inwardly in the directions shown by arrows B by virtue of a force exerted in a direction shown by arrows E by the lower contact surface 600 of the nose-shaped part of the end fitting body. Likewise a generally radially outwardly directed force F as illustrated by the arrows labelled F drives the further arm 830 radially outwardly against the end fitting in a direction illustrated by the arrows labelled G. The flat surface 870 running from the tip 875 of the further arm is thus urged against the surface of the end fitting body forming a metal-to-metal seal.

FIG. 10 illustrates how seal rings according to certain embodiments of the present invention can be utilised with different end fitting mechanisms. More particularly, as illustrated in FIG. 10, a seal ring 1020 can be used to form a seal between an underlying polymer layer 102 and a polymer sleeve 1030. The polymer sleeve 1030 is located in a recess of an inner end fitting member 1040 which is urged against an end fitting body 1050 during a pipe end terminating process. A seal ring 1055 helps seal the interface between the two end fitting parts. A fluid communication passageway 1060 extends from an opening 1065 on an inner surface 1066 of the end fitting body 1050 and extends to a tip of a nose 1070 which extends from the end fitting body 1050 into the recess in the inner end fitting member 1040. A polymer insulating ring 1080 electrically insulates the carcass in the flexible pipe body from the end fitting components, preventing galvanic coupling and possible corrosion between the dissimilar metals as a result.

Throughout the description and claims of this specification, the words "comprise" and "contain" and variations of them mean "including but not limited to" and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A seal ring element for providing a permanent fluid seal between a polymer layer and an end fitting of a flexible pipe, comprising:
    an annular body that has a cross section comprising a first arm portion and further arm portion extending in a spaced apart relationship away from a body end portion, wherein the first arm portion comprises an inner surface and the further arm portion comprises an inner surface, and wherein the inner surfaces form abutment surfaces and are progressively spaced apart in a direction away from the body end portion, to provide a flat bottomed V-shaped groove in the annular body facing away from the end portion;
    wherein, before the seal ring element is energized, the arm portions are substantially wedge shaped, the first arm portion tapering to a narrow first arm end region distal to the body end portion; and
    wherein a thickness of the first arm portion reduces when the seal ring is energized.

2. The seal ring element as claimed in claim 1 wherein an outer pipe body facing surface of the first arm portion is substantially flat.

3. The seal ring element as claimed in claim 2 wherein the outer pipe body facing surface of the first arm portion comprises at least one serration.

4. The seal ring element as claimed in claim 2 wherein the outer pipe body facing surface of the first arm portion extends into a pipe body facing surface of the end portion.

5. The seal ring element as claimed in claim 1, further comprising:
    the further arm portion tapers to a narrow further arm end region distal to the end portion.

6. The seal ring element as claimed in claim 5 wherein an outer polymer sleeve facing surface of the further arm portion is substantially flat.

7. The seal ring element as claimed in claim 6 wherein the outer polymer sleeve facing surface of the further arm portion comprises at least one serration.

8. The seal ring element as claimed in claim 5 wherein the outer polymer sleeve facing surface of the further arm portion extends into a polymer sleeve facing surface of the end portion.

9. The seal ring element as claimed in claim 1, further comprising:
    the further arm portion comprises an outer end fitting facing surface comprising a first flat region extending from a point at an end of a tip of the further arm portion, via a bend, to a further flat region extending towards the end portion.

10. The seal ring element as claimed in claim 1 wherein the end portion comprises an abutment surface extending between a radially innermost and outermost surface of the annular body.

11. The seal ring element as claimed in claim 1, wherein the first arm has a first length and the further arm has a second length shorter than the first length.

12. A method of providing a permanent fluid seal between a polymer layer and an end fitting of a flexible pipe, comprising the steps of:
    as an inner end fitting member is secured to an end fitting body of an end fitting, simultaneously urging a first arm portion of an annular body of a seal ring element, located in a recessed region between the inner end fitting member and the end fitting body, radially inwardly and a further arm portion of the annular body radially outwardly;
    wherein, before the seal ring element is energized, the first arm portion and the further arm portion are substantially wedge shaped, wherein the first arm portion comprises an inner surface and the further arm portion comprises an inner surface, and wherein the inner surfaces are progressively spaced away from the body end portion, to provide a flat bottomed V-shaped groove in the annular body facing away from the end portion;
    wherein the first arm portion tapers to a narrow first arm end region distal to a body end portion of the annular body, and wherein a thickness of the first arm portion reduces when the seal ring is energized; and
    wherein permanent deformation of the first arm portion and the further arm portion results in the permanent fluid seal between the polymer layer and the end fitting.

13. The method as claimed in claim 12, further comprising the steps of:
    urging an outer pipe body facing surface of the first arm portion into a polymer layer of flexible pipe body terminated in the end fitting when the first arm is urged radially inwardly.

14. The method as claimed in claim 12, further comprising the steps of:
    urging an outer polymer sleeve facing surface of the further arm portion into a polymer sleeve, located in an annular space, in the recessed region, between the annular body and the inner end fitting member or the end fitting body when the further arm is urged radially outwardly.

15. The method as claimed in claim 12, further comprising the steps of:
    urging an outer end fitting facing surface of the further arm portion into a radially inwards facing surface of the inner end fitting member or the end fitting body when the further arm is urged radially outwardly.

16. The method as claimed in claim 12, further comprising the steps of:
    providing a positive pressure at an interface region between at least one of the first and further arms and the end fitting body;
    providing the positive pressure via at least one fluid communication passageway that extends from a respective inlet at an inlet region of the end fitting body, in fluid communication with an inner bore region of flexible pipe body being terminated in the end fitting, to a respective outlet in an annular nose-shaped region protruding from an abutment surface of the end fitting body; and
    as the inner end fitting member is secured, driving the inner end fitting member against an abutment surface of the body end portion of the annular body thereby driving the annular body against the nose-shaped region of the end fitting body.

17. The method as claimed in claim 12, further comprising the steps of:
providing the fluid seal between a polymer layer comprising an internal pressure sheath of a flexible pipe and an end fitting of the flexible pipe.

18. A method of terminating flexible pipe body in an end fitting, further comprising the steps of:
cutting each of one or more layers of the flexible pipe body to a respective pre-determined length;
providing an inner end fitting member over an outer layer of flexible pipe body;
providing a seal ring element over the layer of the flexible pipe body, the seal ring element having a cross section that includes two arms which, before the seal ring element is energized, are substantially wedge shaped, a first arm of the two arms tapering to a narrow first arm end region distal to a body end portion, wherein the first arm comprises an inner surface and a second arm of the two arms comprises an inner surface, and wherein the inner surfaces are progressively spaced away from the body end portion, to provide a flat bottomed V-shaped groove in the annular body facing away from the end portion;
providing an end fitting body at a cut end of the flexible pipe body; and
securing the inner end fitting member to the end fitting body whilst simultaneously energising the seal ring element against a polymer layer of the flexible pipe body and a radially outer body comprising a polymer sleeve or surface of the inner end fitting member or end fitting body, wherein a thickness of the first arm reduces when the seal ring element is energized; and
wherein permanent deformation of the arms of the seal element results in a permanent fluid seal between the polymer layer and the end fitting.

* * * * *